May 17, 1955     B. PHILLIPS     2,708,446
VEHICLE WASHING MACHINE

Filed Sept. 13, 1949     4 Sheets-Sheet 1

INVENTOR.
Benjamin Phillips
BY Wood, Arey, Henon & Evans
ATTORNEYS

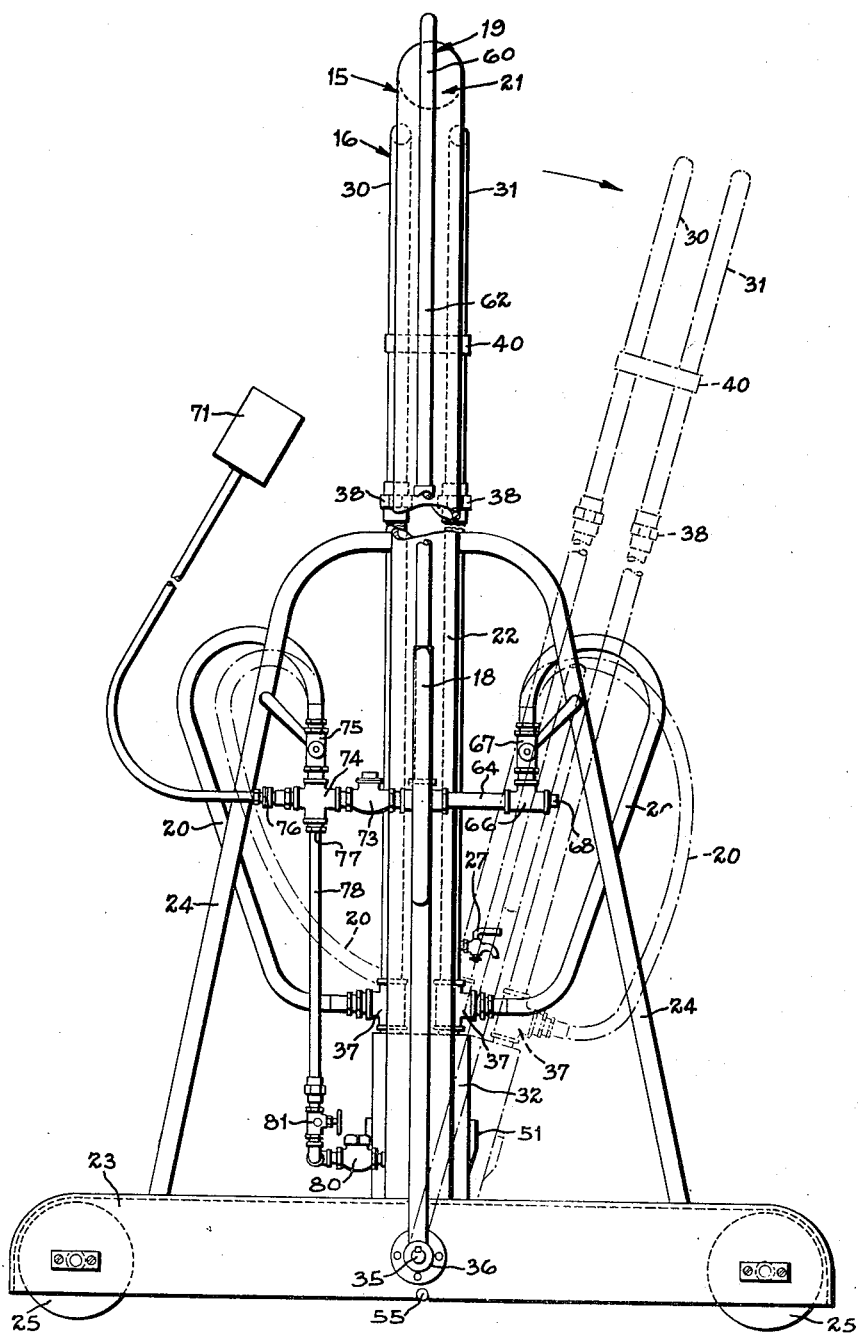

May 17, 1955　　　　　B. PHILLIPS　　　　2,708,446
VEHICLE WASHING MACHINE
Filed Sept. 13, 1949　　　　　　　　　　　4 Sheets-Sheet 3
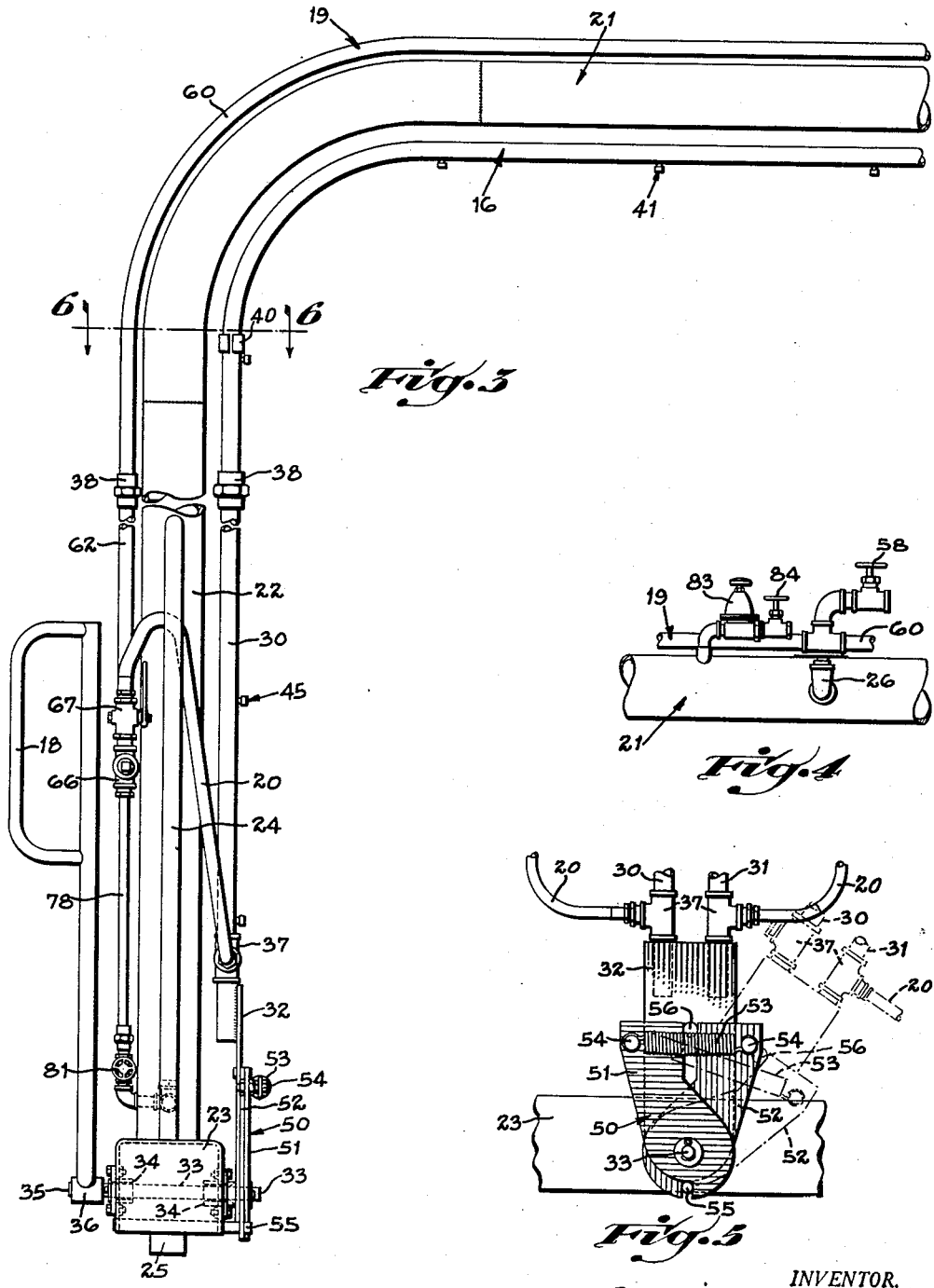

May 17, 1955

B. PHILLIPS 2,708,446

VEHICLE WASHING MACHINE

Filed Sept. 13, 1949

INVENTOR.
Benjamin Phillips
BY
Wood, Arey, Henron & Evans
ATTORNEYS

United States Patent Office 2,708,446
Patented May 17, 1955

2,708,446

VEHICLE WASHING MACHINE

Benjamin Phillips, Cincinnati, Ohio

Application September 13, 1949, Serial No. 115,418

7 Claims. (Cl. 134—93)

This invention is directed to vehicle washing machines and is addressed particularly to machines adapted to wash stock model automobiles and other vehicles, by subjecting the entire exterior body surfaces of the vehicle to sprays of water, detergent solution or both.

Heretofore, the vehicle washing machines most commonly used in automobile laundries have been either tunnel-type machines in which the vehicle is moved bodily through a tunnel past a series of stationary spray nozzles therein, or carriage-type machines in which an arch-shaped nozzle carrier, which is mounted on wheeled carriages, transversely spans the car and is trundled back and forth over the stationary vehicle.

Neither of these types of machines is capable of utilizing the full velocity of the cleansing stream or spray to full advantage, since such structures are inherently incapable of subjecting the car surfaces to uniform optimum steam force at the most effective angles of impingement. In both the tunnel and carriage type machines, the spray dispensing nozzles are fixed on the framework of the apparatus and are positioned to direct a spray curtain in a constant plane, which is usually vertical. Consequently, as the vehicle is moved through the machine, or as the machine is moved over the vehicle, the distance between the various contours of the car surface and the spray nozzles changes substantially, with the result that the force of the spray striking the car surfaces closest to the nozzles is much greater than the force of the spray which falls on more distant portions of the car. Hence, while the top of the vehicle cab receives a spray of adequate velocity, other parts of the car such as the grill and the trunk, receive only a gentle shower of insufficient force to remove firmly adhering road grime and caked mud. Moreover, since the spray curtains are fixed as to direction, the angle at which the liquid impinges upon the car surface varies in accordance with the angle or curvature of the car surface presented to the sprays. Consequently, if the car surface is parallel or oblique with respect to the fixed direction of the curtain, the liquid simply skims the surface or is merely deflected by it, with the result that only dust and loose dirt is washed away and foreign matter which has solidified on the car surface remains undisturbed.

It is the object of this invention to provide a vehicle washing machine including a spray dispensing element which can be moved in a predetermined path back and forth over the vehicle in such a manner that the spray curtain impinges with optimum effective force and in a substantially perpendicular direction on substantially all exposed portions of the car surface.

In recognition of this objective the invention contemplates a car washing apparatus embodying a plurality of sprays which collectively are adapted to project substantially a sheet or curtain of water upon an automobile in directions transversely thereof, and means for advancing this sheet or curtain of water along a path, substantially arcuate, which conforms basically to the arcuate body profile which is characteristic of modern stock model automobiles. The water emerging from the plurality of nozzles is thus caused to impinge upon the various body surface contours at substantially right angles thereto. More specifically, a preferred embodiment for accomplishing the objective of the invention is provided by pivotally mounting a spray dispensing element on the frame of the washing machine to permit the dispenser to be swung in an arcuate path which extends completely over the vehicle body and is subtended by the vehicle length. As the spray curtain is swung back and forth over the vehicle body, the direction of the curtain changes constantly to conform to the changing angulation of the car surface and is, at all times, substantially normal to the car surface on which it impinges. Throughout the path of movement, the spray nozzles are maintained in substantially uniform close relationship to the exposed portions of the car surface so that the source pressure is not materially dissipated by the time the spray strikes the car. Hence, this invention insures the application of the optimum effective force of the stream or spray as well as directing that force at the most effective angle which can be practically utilized to dislodge the accumulated dirt from the car surface.

Briefly described, a machine constructed in accordance with this invention comprises a spray yoke which is adapted to span the top and both sides of the vehicle to be washed and which is pivotally mounted on a suitable support for arcuate swinging movement back and forth over the length of the vehicle to be washed. Spray heads provided on the yoke are spaced and positioned to direct the spray curtain inwardly on the top and both sides of the vehicle.

In operation, the machine is positioned with respect to the vehicle so that the pivotal mounting of the yoke is arranged at the side and near or at the mid-point of the vehicle. The yoke is then swung back and forth over the vehicle in an arcuate path which extends over the car from front to rear. During this movement, rinse water is forced through the nozzles and onto the car thereby conditioning the car surface and flushing off dust and loose dirt. The operator then manipulates the controls so that detergent solution is forced through the yoke nozzles and the entire process is repeated with the result that the car surface is covered by a film of detergent. At this point, it may be necessary for the operator to use a sponge, mop or brush on the car surface to remove the unduly resistant dirt and grime. The controls are then again changed so that rinse water is supplied to the yoke and the yoke is again waved back and forth over the vehicle to rinse off the detergent and the entrained dirt. Hence, by the use of this machine a single operator can, selectively, subject the entire exterior body surfaces of the car to alternate sprays of cleansing solution and rinse water, performing the conditioning, washing, and rinsing, operations in sequence without the necessity of moving a heavy car or a heavy washing machine at any time during the entire process.

Equipment constructed in accordance with this invention is susceptible to modern, low cost, manufacturing techniques, and does not require the use of complex, structural components. There is virtually no installation cost whatsoever since it is possible for a semi-skilled workman to install the completely assembled machine at any convenient location where water is available. Consequently, the machine fulfills the previously existing need for a portable machine of inexpensive manufacture, which can be quickly installed at almost any convenient location and by the use of which a single operator can successively wash a large number of vehicles quickly, efficiently and with a minimum of effort.

Other objects and advantages of this invention will become apparent from the following description of the drawings in which:

Figure 2 is an elevation taken from one side of the machine in which the dotted lines indicate positions assumed by the spray yoke during the washing operation.

Figure 3 is an enlarged front elevation of approximately one-half of the machine. Since the other half is substantially identical, it is not shown in this view.

Figure 4 is a front elevation of the top center portion of the frame showing part of the air and water line connections.

Figure 5 is an elevation of the centering and balancing mechanism.

Figure 1:
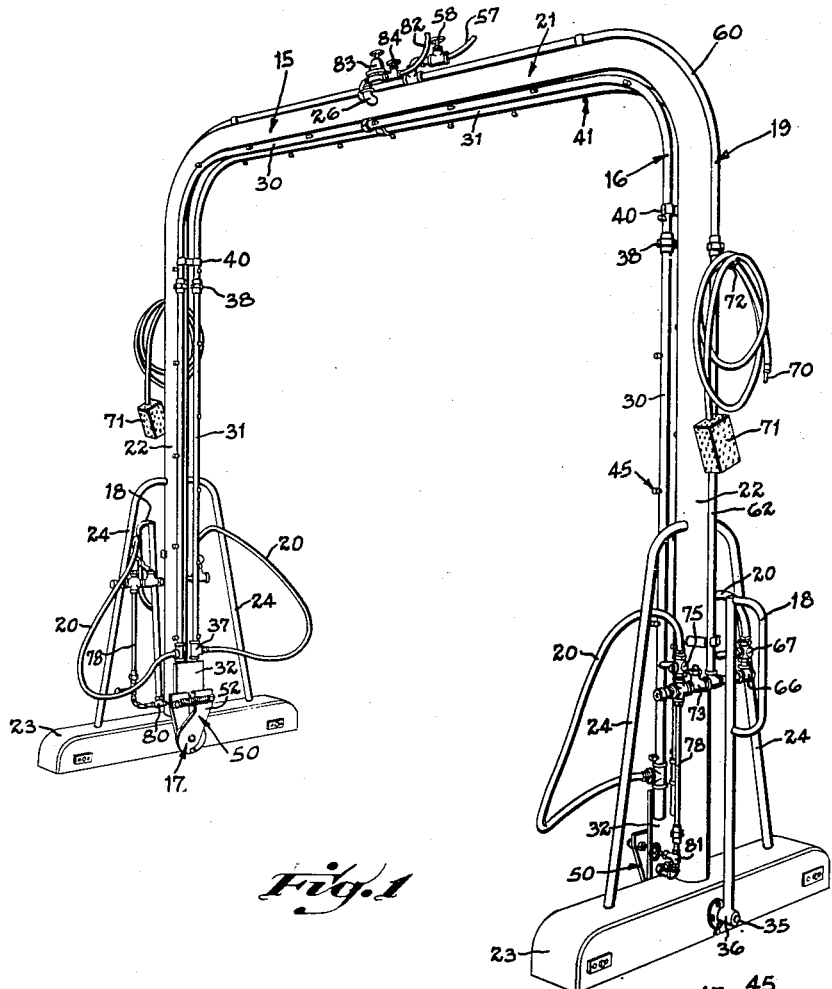
Figure 1 is a perspective view of the improved vehicle washing machine of this invention.

As best seen in Figures 1 and 2, a typical machine constructed in accordance with this invention comprises an arch-shaped frame, indicated generally at 15, which is adapted to transversely span the vehicle to be washed, a yoke or spray element 16 which also transversely spans the vehicle and which is pivotally mounted (as at 17) on the frame for movement in an arcuate path back and forth over the vehicle, hand levers 18 for moving the yoke through its path, and pipe lines 19 and hose lines 20 for delivering, washing and rinsing fluid to the spray yoke.

In the preferred embodiment, the frame of this machine comprises a tubular member 21 of inverted U-shaped configuration which is suitably dimensioned to easily accommodate standard automobiles and small trucks. The legs 22 of this member 21 are mounted on inverted channel-type bases 23 being supported thereon by brace rods 24 which extend angularly between the respective legs 22 and bases 23. In order to facilitate movement of the washing machine from place to place about the building and to provide convenient means for moving the machine in position over the vehicle the bases may be equipped with rollers or wheels 25. However, if the washing machine is to be permanently placed at a given location, the wheels may be omitted.

The arch-shaped frame 15 not only serves to structurally reinforce and stabilize the machine against torsional forces established as the yoke is swung back and forth, but also provides a reservoir for a quantity of liquid detergent which, as hereinafter will be explained, may be mixed in controlled quantities with feed water to provide the vehicle cleansing solution. The detergent is introduced into the reservoir through an inlet nipple 26 at the top of the frame and may be drained from the reservoir through faucet taps 27 provided near the bottoms of the legs 22, see Figures 2 and 9.

In the construction illustrated, the yoke or spray element which delivers the liquid detergent and rinse water to the vehicle is comprised of spaced parallel pipe lines 30 and 31, also of arch-shaped configuration and dimensioned so that the length of the arch slightly exceeds one-half of the length of standard automotive vehicles. These lines are fixed at their respective ends on swivel plates 32, pivotally mounted on shafts 33 extending through the bases. These shafts are respectively journalled in bearings 34 bolted to the opposite side walls of the respective bases. The outer end 35 of each shaft projects laterally from its base and is keyed within a collar 36 fixed at the lower end of a hand lever 18. Hence, as illustrated in the dot-dash lines in Figure 2, turning movement of the lever about the shaft axis will cause rotation of the shaft and consequent arcuate movement of the yoke over the length of the vehicle.

It will be readily apparent to those skilled in the art that a number of other constructions can be utilized for the spray yoke. For example, a single spray line can be used to alternately carry and dispense the rinse water and the cleansing solution if appropriate connections are made to the respective sources of the liquids. However, I have found that it is desirable if two spray conduits 30 and 31, which are respectively adapted to dispense the different fluids, are utilized thereby avoiding the inevitable intermixture of the residual fluid with the feed fluid, which occurs whenever the fluids are changed in a single line. Hence, line 31 carries and discharges clear rinse water while line 30 carries and discharges a soapy or detergent solution also under pressure. The lines are respectively fed from either or both ends by flexible hoses 20, one end of each hose being coupled to a T fitting 37 on the lower end of the respective line and the other end of each hose being in communication with the respective source of rinse water or detergent solution. Thus, the flexible hoses follow the movement of the yoke and permit continuous feed of the liquids at all positions and angles assumed by the yoke.

Figure 6:
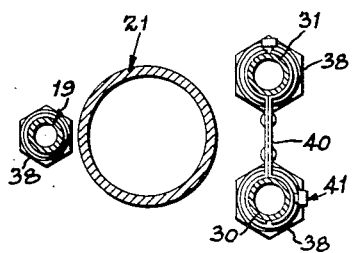
Figure 6 is a cross-sectional view taken along line 6—6 of Figure 3.
Figures 7, 8:
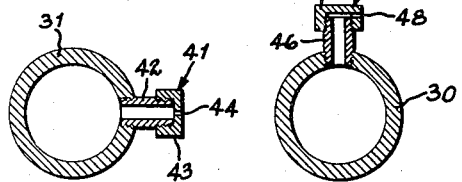
Figure 7 is an enlarged cross-sectional view taken through the center of an inwardly projecting spray nozzle.
Figure 8 is an enlarged cross-sectional view taken through the center of a laterally projecting spray nozzle.

As best seen in Figures 3 and 6, the spray lines can be fabricated from pipe sections joined by couplers 38 and are maintained in spaced relationship by separator straps 40 located at convenient points along the length of the lines. Each line is equipped with spaced spray nozzles which are directed collectively to discharge a curtain of spray in the plane of the yoke radially inwardly toward the axis of the yoke pivot. Some of the nozzles 41 (shown in Figure 7) project directly inwardly from the spray line and comprise a bored plug 42 screw-threaded into the inner side wall of the line with a cap 43 mounted on the end of the plug having a restricted discharge aperture 44 in axial alignment with the plug bore. Other nozzles 45 project laterally from the side wall of the spray lines and comprise bored plugs 46 provided with a cap 47 having a radial discharge aperture 48. Thus, both of the nozzles direct sprays inward from the yoke and against the side or top surfaces of the vehicle. While these constructions and this arrangement of the nozzles is desirable in that a thick curtain in which the several sprays do not conflict is provided, other types and models of spray or jet nozzles may, of course, be used.

In order to facilitate control of the yoke during the washing operation, a centering and balancing mechanism 50 is provided to serve the dual function of counter-balancing the weight of the yoke as it is moved away from the vertical position and automatically returning the yoke to the centralized vertical position when it is not in use. In fact, dual centering and balancing mechanisms are provided, one on each side of the machine, but since they may be of identical construction, only one is described in detail. As best seen in Figures 3 and 5, the mechanism comprises crossed arms 51 and 52, co-axially mounted between their respective opposite ends on the pivot shaft 33. Each arm may rotate relative to the shaft and independently of the other arm. A tension spring 53 stretched between the upper ends of the arms and fixed to anchor pins 54 on each arm constantly tends to draw the upper ends of the arms together. However, a stop pin 55 rigidly secured in the base and projecting inwardly therefrom is designed to abut the lower ends of the arms and thus prevent movement of the arms beyond a predetermined limit. Hence, arm 52 is free to pivot clockwise about the shaft to the limit of spring expansion in that direction, but is prevented from pivoting counter-clockwise about the shaft beyond the substantially vertical position shown in solid lines in Figure 5 by the abutment of the lower end of the arm with stop pin 55. On the other hand, arm 51 is free to pivot about the shaft in a counter-clockwise direction, but is prevented from pivoting in a clockwise direction beyond the vertical position by the stop pin.

The stop pin is so located and the upper ends of the arms so configurated that when both arms are in a substantially vertical position, a space exists between the inner surfaces of the upper arms. A stud 56, mounted on the swivel plate, projects through this space and abuts the inner surfaces of each arm. Now, when the yoke is moved arcuately about the shaft in either direction from the vertical position, the stud on the swivel plate drives one of the arms ahead of it in arcuate movement. The other arm is prevented from moving by the abutment of its lower end with the stop pin (see the position shown in the dotted lines in Figure 5). Hence, as the angle between the yoke and vertical position increases, the spring 53 is expanded, and applies steadily increasing tension on the arm which reacts on the stud 56 to effectively counter-balance the progressively increasing torque produced by the weight of the yoke as it moves away from the vertical position. Preferably, the spring is carefully selected so that at any given position of the yoke the tension exerted by the spring is equal to the torque produced by the weight of the yoke at that position.

Under these conditions, the operator may move the yoke to any given angular position and the yoke will be held in that position by the spring action, even though the operator releases the hand lever. On the other hand, the spring 53 is effective to automatically return the yoke to vertical position if the operator overcomes the initial static inertia by giving the yoke a little push toward the vertical direction. As the yoke approaches the vertical position, its momentum may tend to carry it slightly beyond the vertical, whereupon it will immediately be engaged by the other operating arm which will resist the tendency to overtravel and return it to the vertical position. If it again overtravels in the original direction, the first arm will return the yoke to the vertical and thus the oscillations of the yoke are dampened quite effectively by the respective arms.

Figure 9:
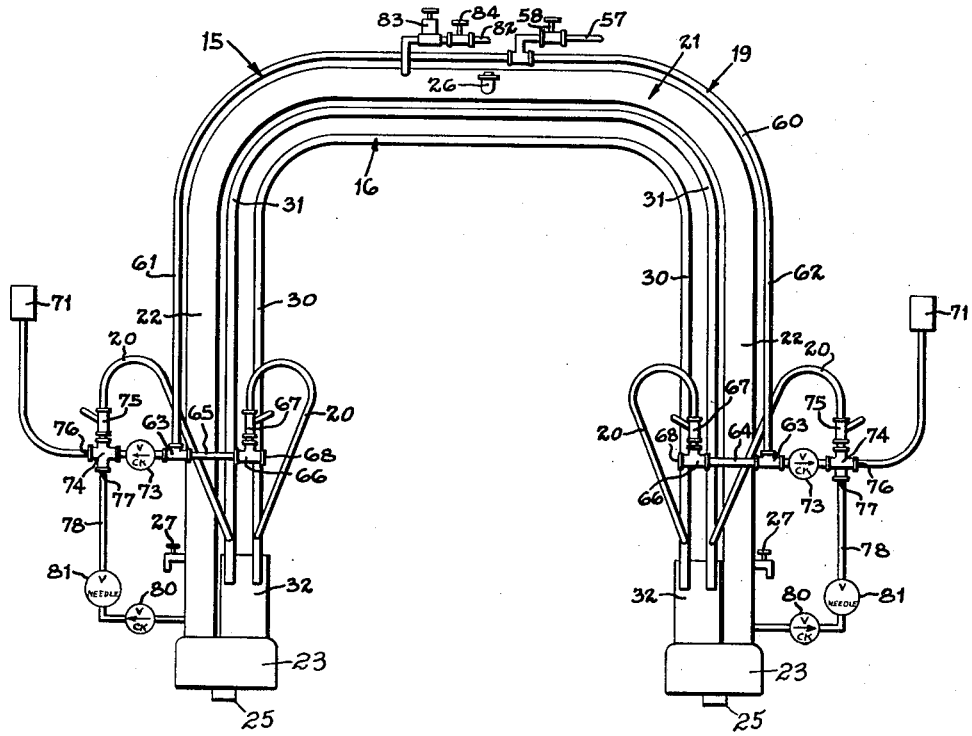
Figure 9 is a diagrammatic view, partly symbolic, showing the various air, water, and detergent solution line connections to the spray lines.

The water and detergent supply circuits with their attendant controls are illustrated symbolically in Figure 9 and actually in Figures 1, 2 and 3. Clear feed water is supplied to the unit from a convenient source (such as hose line 57) through a valve 58 which controls the main delivery line 60. Line 60 is also U-shaped and follows the general configuration of the arch along the opposite legs of the frame member. The legs 61 and 62 of line 60 terminate in T-fittings 63 on the opposite sides of the machine from which branch lines 64 and 65 lead to the clear water spray conduit 30 and detergent spray conduit 41 respectively. On each side of the machine, communication between the main delivery line 60 and the water conduit 30 is direct and proceeds from T 63 through line 64 to another T 66, thence through a shut-off valve 67 into the flexible hose 20 and into the clear water spray line 30. The T 66 is equipped with a self-closing socket 68 adapted to receive a plug connector 70 fastened to the end of a fountain sponge attachment 71. This attachment may be used to scrub the wheels of the car and to remove caked mud or dirt on the car surface which resists dislodgment by stream or spray pressure. When not in use, it may be detached and hung on a convenient bracket 72 fastened to the frame member.

Communication between the main delivery line and the detergent spray line 31 is also direct. However, in this instance, means are provided for introducing and mixing controlled quantities of detergent liquid with the feed water before it enters the spray line. Hence, branch line 65 leading from T-fitting 63 contains a one-way check valve 73 which permits flow only in the direction away from the delivery line. Beyond check valve 73, line 65 junctures with a four-way union 74, the flow of feed water proceeding therefrom through a shut-off valve 75 and flexible hose 20 to the detergent spray line 31. One mouth 76 of the four-way union 74 constitutes a self-sealing socket for the plug connector carried at the end of the fountain sponge attachment 71 previously described. Another mouth 77 of the four-way union 74 receives the end of the detergent supply line 78 which connects the union 74 to the bottom of the detergent reservoir. This line contains a check valve 80 which permits flow from the detergent reservoir to the union 74 and an adjustable flow control valve 81, which may be of the needle type, interposed between the check valve and the union.

The detergent is forced through the detergent supply line 78 by pressure exerted upon the detergent solution contained in the reservoir. The main source of pressure is provided by compressed air which is introduced into the reservoir at the top of the member 21 through a line 82. This air supply line contains an adjustable air regulator 83 and a shut-off valve 84. It will also be noted that the detergent liquid stacked in the legs 22 of the member 21 provides a vertical pressure head which supplements the air pressure.

It will be observed that the check valve 73 which is spring loaded will only permit flow from the T 63 to the union 74 and will not permit flow in the opposite direction. Thus, it prevents flow of detergent into the clear water spray conduits 31. Moreover, check valve 80 which is spring loaded is designed to open automatically when fluid is flowing to the detergent spray conduits and to close when fluid contained in that line does not flow. Hence, valve 80 is selected so that it responds to the pressure changes between the static and dynamic fluid conditions; that is, opening when water is flowing through union 74 to the detergent conduit and relatively low pressure conditions exist, and closing when water is static in the union and relatively high pressure conditions exist. This is accomplished by setting the air pressure of the detergent reservoir so that the pressure is sufficient to force detergent past the valve 80 when water is flowing through the union, but is not sufficient to force detergent past the valve when static fluid pressure conditions exist in the union. The operator can accomplish this by closing shut-off valve 67 and then repeatedly opening and closing shut-off valve 75, meanwhile adjusting the air pressure regulator 83 so that detergent flow occurs past the check valve 80 when valve 75 is opened and does not occur when valve 75 is closed. Hence, if a number of cars are to be washed, the operator may make the initial adjustment as indicated and need not thereafter concern himself with further adjustment of the air pressure. The amount of detergent passed into solution is controlled by adjustment of the needle valve 81.

The detergent feed system just described is adapted to dispense controlled quantities of detergent solution from the reservoir into mixture with the feed water when the detergent spray line is being used, but seals the detergent reservoir from the system when the clear water rinse line is in use. In other words, the feed system automatically mixes the required amount of detergent solution when the incoming feed water is passed to the line 31 and is automatically shut off by the pressure rise when the incoming feed water is routed to the line 30, thereby preventing intermixture of the detergent with the clear water during the rinsing operations. Valve 80 also prevents the feed water from backing into the detergent reservoir and diluting the detergent solution regardless of whether the detergent spray conduit or the clear water spray conduit or neither of them is being used.

Furthermore, the operation of the detergent dispensing system is automatic in that it begins to operate as soon as the shut-off valve 75 is opened and the shut-off valve 67 is closed, because under these conditions dynamic fluid conditions exist in conduit 31 and valve 80 opens. Moreover, it is shut off as soon as valve 75 is closed and the valve 67 is opened because static fluid conditions exist in union 74 and check valve 73 prevents counterflow from the reservoir to the conduit 30. It is also inoperative when both valves 67 and 75 are closed because static fluid conditions exist throughout the system. Hence, control of the detergent feed system is achieved by manipulation of the valves 67 and 75 and it is not necessary to provide adjustable shut-off valves in the detergent line or to manually turn the detergent feed system on and off as the feed water is alternately routed between the spray conduits 30 and 31.

It will be observed that duplicate controls are provided on opposite sides of the machine and are conveniently located in relation to the levers 18 which control the yoke movement. Hence, a single operator working from either side of the machine can control the movement of the yoke and can also manipulate the various valves which control the rinse and detergent spray lines without leaving his position. Of course, if it is necessary to scrub unduly resistant dirt or grime from the car surface or to apply the fountain brush to the wheels of the car in order to clean them, the operator may have to leave his position. However, in the usual case, when the car is only covered with a light film of dust or dirt which the operator can remove without scrubbing the car, he may accomplish the entire washing operation without leaving his position at the side of the machine.

In operation, either the car or the machine is moved to a position where the machine straddles the car at or near its mid point. Connections are then made to the compressed air and water sources respectively and the operator may make the adjustment of the air pressure regulator previously described. Fountain sponges 71 or brushes are then plugged into the socket connections 76 and the operator scrubs the car wheels with the soapy solution. After disconnecting the fountain brushes, the operator opens shut-off valve 67 and clear water flows through the rinse line 30. By manipulating the hand lever 18, he proceeds to wave the yoke back and forth in an 180° arc over the complete length of the vehicle. This operation serves to initially wet and loosen the dirt on the car and also serves to cool the car surface if it has been standing in the sun.

At the completion of this operation, shut-off valve 67 is closed and shut-off valve 75, which controls the detergent spray line, is opened. By repeating the waving motion, the entire car is then covered with detergent solution. If the operator deems it necessary, he may now mop the entire car with a soft sponge to loosen the dirt and to give the detergent opportunity to work to full advantage.

Shut-off valve 75 is now closed and after the detergent has had opportunity to work on the surface of the car, valve 67 is actuated, reopening the rinse spray line and the entire car surface is sprayed with rinse water until all of the detergent and the accumulated dirt and grime has been removed. The car may then be removed from the machine and the concave portions of the car surface which have collected water can be dried with a chamois.

Figure 10:
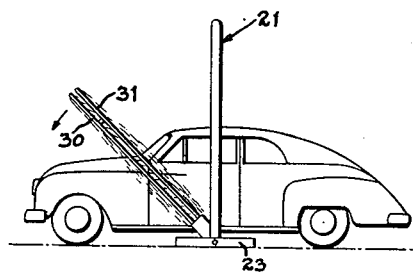
Figure 10 is a diagrammatic view showing the manner in which the washing machine is operated to wash the front of an automobile.
Figure 11:
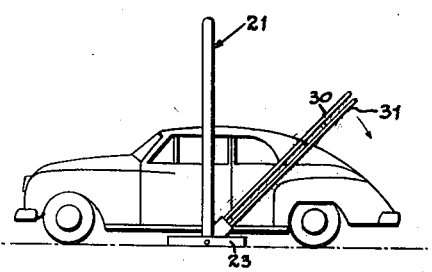
Figure 11 is a diagrammatic view showing the manner in which the washing machine is operated to wash the back of an automobile.

It will be observed from an inspection of Figures 10 and 11 that the movement of the spray lines in an arcuate path back and forth over the length of the vehicle is such that the spray nozzles are always in a position which is relatively close to the car surface. Consequently, the spray or jets strike the surface before they have had a chance to dissipate and lose their initial force. Moreover, since certain parts of modern cars, the backs in particular, are gently curved, their contours correspond generally to the path of movement of the yoke. Consequently, the angle at which the jet or spray strikes the car surface presented to it is substantially normal, and the full force of the spray curtain is brought to bear on the surface. It is appreciated that the various makes and models of automobiles vary in design. Obviously, an automatic washing machine which would always direct the spray at the most effective angle on every surface of all different types of trucks and cars would be extremely complex and so expensive that it would be impractical. However, for the most part, the new automobile designs do not substantially depart from a basic arcuate contour and this invention, by achieving a machine which directs spray curtains at substantially right angles to such a contour, closely approaches the theoretically perfect washing machine and represents a distinct improvement over the art.

It should be clearly understood that the invention herein disclosed is not limited to the specific embodiment shown. It is subject to a number of variations which those skilled in the art can readily comprehend. For example, it is not necessary to utilize spaced parallel pipe lines for the yoke element. A single spray line provided with means for selectively directing detergent solution or rinse water therethrough may be used. Moreover, the exact means for mixing the detergent solution disclosed herein need not be used but other more conventional substitutes may be supplied therefore.

Having described my invention, I claim:

1. Vehicle washing apparatus comprising; a conduit configurated substantially to complement the lateral contour of a vehicle to be washed, said conduit being adapted to carry cleaning fluid and having a plurality of nozzles extending therefrom substantially in a common plane, a base member, means for pivotally mounting said conduit on said base member, and means for guiding said conduit through a path approximating the longitudinal contour of a vehicle whereby said nozzles are effective to direct cleaning fluid upon the surfaces of the vehicle to be washed, said cleaning fluid impinging upon said surfaces at generally right angles.

2. Car washing apparatus comprising; a pair of pedestals which are spaced apart a distance sufficient to receive a vehicle between them, a U-shaped conduit adapted to straddle said vehicle, the said conduit having its ends respectively pivotally mounted on said pedestals, a plurality of nozzles projecting from said conduit substantially in a common plane and directed inwardly toward a vehicle, straddled by said conduit, and means for delivering cleaning liquid under pressure to said conduit during pivotal movement thereof.

3. Car washing apparatus comprising; pedestal members which are spaced apart from one another a sufficient distance to receive a vehicle to be washed between them, a self-sustaining U-shaped conduit having its endwise portions respectively pivotally mounted on said pedestal and being adapted to straddle a vehicle to be washed, the said conduit having a plurality of nozzles which are directed toward a vehicle placed between said pedestals, said yoke being sufficient in length to be swung arcuately from a point beyond one end of the vehicle, over the vehicle, to a point beyond the other end, and means for delivering pressure liquid to said conduit during arcuate pivotal movement thereof.

4. A vehicle washing machine comprising; a support, a base spray yoke pivotally mounted on said base support and adapted to transversely span top and sides of a vehicle to be washed, means for moving said spray yoke in an arcuate path back and forth over the vehicle to be washed, means for counter-balancing said yoke as it is moved through its path, and means for supplying a vehicle cleaning fluid to said yoke.

5. Car washing machine comprising; an arch-shaped frame, said frame comprising a tubular frame member adapted to span the vehicle to be washed and bases for said frame member, said farme member constituting a pressure reservoir for a quantity of detergent mixing agent, a nozzle-carrying spray yoke of arch-shaped configuration, said yoke adapted to transversely span the vehicle to be washed and being pivotally mounted on said frame for arcuate movement back and forth over said vehicle, means for supplying water to said yoke and means for selectively feeding said detergent mixing agent from said reservoir into mixture with said feed water whereby rinse water or detergent cleaning liquid can be fed to said yoke.

6. A vehicle washing machine comprising; a support, an arch-shaped spray yoke adapted to span the vehicle to be washed, said yoke being pivotally mounted about a horizontal axis on said support for arcuate movement back and forth over the length of the vehicle to be washed, a centering mechanism for said yoke adapted to hold said yoke in substantially vertical position to permit said yoke to be located in spanning relationship with said vehicle, said centering mechanism including spring means adapted to exert a steady increasing tension on said yoke as it is moved away from said vertical position thereby counter-balancing the weight and steadily increasing torque exerted by the yoke as it is so moved.

7. A vehicle washing machine comprising; an arch-shaped spray conduit adapted to transversely span the vehicle to be washed, a pair of spaced base supports, the ends of said conduit being pivotally mounted on a common axis on said base supports for arcuate movement of said conduit back and forth over the length of the vehicle to be washed, spaced spray nozzles fixed on said conduit and positioned to establish a spray curtain substantially in a plane including said conduit and said pivot axis, and means for supplying cleansing liquid under pressure to said conduit, whereby as said conduit is moved through its path a spray curtain is established which is always disposed radially in relation to said pivot axis and which impinges substantially normally on arcuate vehicle surfaces having a common center with said pivot axis and interposed between said nozzles and said pivot axis.

References Cited in the file of this patent

UNITED STATES PATENTS

| | | |
|---|---|---|
| Re. 23,294 | Hopper et al. | Nov. 21, 1950 |
| 673,699 | Chapman et al. | May 7, 1901 |
| 1,481,601 | Goldman et al. | Jan. 22, 1924 |
| 1,682,902 | Gibson | Sept. 4, 1928 |
| 1,866,197 | Cunningham | July 5, 1932 |
| 1,879,101 | Coleman | Sept. 27, 1932 |
| 1,942,653 | Kiggins | Jan. 9, 1934 |
| 1,988,665 | Ross | Jan. 22, 1935 |
| 2,012,178 | Anderson | Aug. 20, 1935 |
| 2,014,037 | Burkett et al. | Sept. 10, 1935 |
| 2,228,205 | Dwyer | Jan. 7, 1941 |
| 2,296,055 | Ray | Sept. 15, 1942 |
| 2,419,397 | Frohoff et al. | Apr. 22, 1947 |